United States Patent
Lecocq

(10) Patent No.: US 8,820,062 B2
(45) Date of Patent: Sep. 2, 2014

(54) HYDRAULIC TORQUE CONVERTER FOR AUTOMOTIVE VEHICLE

(75) Inventor: Emmanuel Lecocq, Naours (FR)

(73) Assignee: Valeo Embrayages, Amiens (FR)

(*) Notice: Subject to any disclaimer, the term of this patent is extended or adjusted under 35 U.S.C. 154(b) by 1374 days.

(21) Appl. No.: 12/521,504

(22) PCT Filed: Feb. 1, 2008

(86) PCT No.: PCT/FR2008/050168
§ 371 (c)(1),
(2), (4) Date: Sep. 22, 2010

(87) PCT Pub. No.: WO2008/104670
PCT Pub. Date: Sep. 4, 2008

(65) Prior Publication Data
US 2011/0000204 A1 Jan. 6, 2011

(30) Foreign Application Priority Data
Feb. 2, 2007 (FR) ...................................... 07 53034

(51) Int. Cl.
*F16H 41/24* (2006.01)
(52) U.S. Cl.
CPC ..................................... *F06H 41/26* (2013.01)
USPC ............................................. 60/367; 60/361
(58) Field of Classification Search
USPC ........................................... 60/330, 361, 367
See application file for complete search history.

(56) References Cited

U.S. PATENT DOCUMENTS

| 2,779,292 | A | * | 1/1957 | Zeidler | 416/180 |
| 2,855,852 | A | * | 10/1958 | Gamble | 416/180 |
| 3,503,209 | A | | 3/1970 | Loffelholz | |
| 3,517,789 | A | * | 6/1970 | Gimmler et al. | 192/3.21 |
| 3,797,243 | A | * | 3/1974 | Trusov | 60/361 |
| 4,665,693 | A | * | 5/1987 | Misu et al. | 60/330 |
| 5,058,027 | A | * | 10/1991 | Becraft | 700/97 |
| 5,168,702 | A | * | 12/1992 | Sakakibara et al. | 60/345 |
| 5,224,348 | A | * | 7/1993 | Ejiri | 60/361 |
| 5,313,793 | A | * | 5/1994 | Kirkwood et al. | 60/361 |
| 6,996,978 | B2 | * | 2/2006 | Goerend | 60/361 |
| 7,152,400 | B2 | * | 12/2006 | Schleicher et al. | 60/367 |
| 2005/0247054 | A1 | | 11/2005 | Goerend | |

FOREIGN PATENT DOCUMENTS

JP 02 006847 U 1/1990
JP 10 156465 6/1998

OTHER PUBLICATIONS

Written Opinion of the International Search Authority for PCT/FR2008/50168.

* cited by examiner

*Primary Examiner* — Thomas E Lazo
(74) *Attorney, Agent, or Firm* — Berenato & White, LLC

(57) ABSTRACT

A hydraulic torque converter for a vehicle, that comprises an impeller (I), a turbine (T) and a reactor (R) with a coaxial axis (A), and respectively fitted with impeller (1), turbine (2) and reactor (3) vanes, each defined by an inner side edge (11;21; 31), an outer side edge (12;22;32), a trailing edge (13;23;33) and a leading edge (14;24;34), wherein the trailing edge (13) of the impeller is separated by an axial distance d1 from the leading edge of the turbine, and the trailing edge of the turbine is separated by an axial distance d2 from the leading edge of the reactor, the d2/d1 ration being equal to or lower than 1.4.

10 Claims, 4 Drawing Sheets

HYDRAULIC TORQUE CONVERTER FOR AUTOMOTIVE VEHICLE

CROSS-REFERENCE TO RELATED APPLICATIONS AND CLAIM TO PRIORITY

This application relates to International Application No. PCT/FR2008/050168 filed Feb. 1, 2008 and French Patent Application No. 0753034 filed Feb. 2, 2007, of which the disclosures are incorporated herein by reference and to which priority is claimed.

The present invention relates to a hydraulic torque converter, in particular as used for automatic transmissions.

The prior art discloses a torque converter as described in U.S. Pat. No. 5,168,702 and as shown in FIG. 1, used in the automotive field as a hydrokinetic clutch, comprising:

an impeller 1 with axis A driven by an input shaft M coupled to an engine (not shown), and provided with a set of impeller 1 vanes;

a turbine T with axis A driving an output shaft S, and provided with a set of turbine 2 vanes facing the set of impeller 1 vanes; and a reactor R mounted on a free wheel about the axis A and provided with a set of reactor 3 vanes interposed between the sets of turbine and impeller vanes. The term "mounted on a free wheel" means that said reactor can only turn freely about axis A in one direction, the other direction being termed the "locked direction".

The vanes of the impeller 1, the turbine 2 and the reactor 3 are each defined by an inner side edge 11; 21; 31, an outer side edge 12; 22; 32, a trailing edge 13; 23; 33 and a leading edge 14; 24; 34, the inner side edges of the impeller vanes 11, the turbine vanes 21 and the reactor vanes 31 defining, during rotation thereof about the axis A, an inner core of revolution 40 about the axis A.

The assembly is placed in a sealed housing comprising a certain quantity of a hydraulic fluid, generally oil, with a low viscosity index, but with a high density. In the case of a converter, the sealed housing is completely filled with said hydraulic fluid.

A hydraulic torque converter allows the vehicle to start off progressively and also allows engine torque multiplication when the ratio, i, of the rates of rotation of the turbine and the impeller is low, i.e. lower than 0.5, preferably lower than 0.2.

The ratio i of the rates of rotation is defined as:

$$i = N_T/N_I$$

where $N_T$ and $N_I$ are the rate of rotation of the turbine and the impeller respectively, in revolutions per minute.

When the engine is idling, the impeller rotates at the speed of the engine, the turbine receives a slight thrust and the reactor does not turn.

When the engine accelerates but the vehicle remains stopped or starts to move, the rotation of the impeller communicates a helical movement to the oil, represented by the arrow F1, around the inner core of revolution 40. Said turbine then receives a flow of oil which gives a large proportion of its kinetic energy up to it. The turbine can then transmit a torque to the output shaft and drive it in rotation.

The reactor receives the flow of oil from the turbine at a favourable angle tending to force its vanes in the locked direction. It sends this flow to the back of the vanes of the impeller in a balanced manner. The backs of the vanes of the impeller are thus subjected to a hydraulic pressure deriving from the reactor, which it re-transmits to the turbine, thereby increasing the torque of the turbine. This step is termed the conversion phase. Advantageously, the hydraulic torque converter multiplies the engine torque by 1 or more during the conversion phase. The turbine torque is thus greater than or equal to that of the impeller.

When the rotational speed of the turbine increases progressively and approaches that of the impeller, the oil flow is sent in the direction of the reactor at a different angle. The reactor starts to receive the flow of oil in the extension of its vanes then, when the turbine is turning substantially at the same speed as the impeller, in the back of its vanes. The backs of the reactor vanes are subjected to a hydraulic pressure which drives the reactor in rotation in the free direction of its free wheel. Thus, it can turn about the axis A. It then turns substantially at the same speed as the turbine and the impeller.

In general, two operational phases can be distinguished: a phase termed the converter phase, broadly corresponding to a ratio i in the range 0 to 0.8, and a coupling phase, broadly corresponding to a ratio i in the range 0.8 to 1 (when locked by the clutch).

When conversion ends, the hydraulic torque converter behaves as a simple coupler.

Using a hydraulic torque converter means that:
progressivity and flexibility are better than that obtained with a mechanical clutch;
gear changes are less frequent;
the mechanical elements of the engine and transmission last longer.

For a torque converter, its torque ratio is defined as follows:

$$TR = C_T/C_P$$

in which $C_T$ is the turbine torque and $C_P$ is the impeller torque. The torque ratio of a converter varies as a function of the rate ratio i defined above.

The torque capacity $M_P$ of a hydraulic torque converter is defined as the torque absorbed, in Nm, by the impeller when it turns at 1000 rpm$^{-1}$. The torque capacity of a hydraulic torque converter depends on the ratio of rates, i, defined above.

Selecting the torque capacity of the converter depends on the torque characteristic of the engine. If the torque capacity is too high with respect to the engine torque, when the vehicle starts off, the rate of rotation of the engine will not increase sufficiently and the vehicle will labour. Conversely, if the torque capacity of the torque converter is too low compared with the engine torque, the engine will race and the vehicle will not have the expected acceleration performance.

Until now, hydraulic torque converters have been known to have either a high torque ratio or a high torque capacity: when converters comprise an inner core of revolution defined by shells, for a fixed volume the increase in the torque capacity causes a reduction in the torque ratio. In the case of converters which do not have an inner core of revolution, such as in JP 05-296344, the increase in torque ratio is accompanied by a reduction in torque capacity.

There exists a need to increase the torque capacity of torque converters in a fixed volume while retaining a minimum torque ratio.

It is an aim of the present invention to satisfy this need.

The invention concerns a hydraulic torque converter for an automotive vehicle, comprising an impeller I, a turbine T and a reactor R coaxial with an axis A and provided with impeller 1 vanes, turbine 2 vanes and reactor 3 vanes respectively, each defined by an inner side edge 11; 21; 31, an outer side edge 12; 22; 32, a trailing edge 13; 23; 33 and a leading edge 14; 24; 34;

the set of turbine 2 vanes defining, during rotation thereof, a turbine envelope 52, said envelope 52 comprising a turbine inner side surface 62, a turbine trailing surface 82 and a turbine leading surface 92, defined by the inner side edges 21, the trailing edges 23 and the leading edges 24 respectively of said turbine 2 vanes during said rotation;

the set of impeller 1 vanes defining, during rotation thereof, an impeller envelope 51, said envelope 51 comprising an impeller inner side surface 61, an impeller trailing surface 81 and an impeller leading surface 91, defined by the inner side edges 11, the trailing edges 13 and the leading edges 14 respectively of said impeller 1 vanes during said rotation;

the set of reactor 3 vanes defining, during rotation thereof, a reactor envelope 53, said envelope 53 comprising a reactor inner side surface 63, a reactor trailing surface 83 and a reactor leading surface 93, defined by the inner side edges 31, the trailing edges 33 and leading edges 34 respectively of said reactor 3 vanes during said rotation;

the side surfaces of the turbine, impeller and reactor together defining an envelope of an inner core of revolution;

the impeller trailing surface 81 being separated by an outer axial distance d1 from the turbine leading surface 92, the turbine trailing surface 82 being separated by an inner axial distance d2 from the reactor leading surface 93, the outer and inner axial distances respectively corresponding to the minimum axial distance between the surfaces concerned at the facing points which are closest to each other;

the torque converter being characterized in that the ratio of the distances d2/d1 is equal to or lower than 1.4, and in that the reactor comprises at least one vane the leading edge of which defines said reactor leading surface during rotation thereof, said vane being qualified as the "elongated" reactor vane.

Surprisingly, the inventors have observed that bringing the leading edge of the reactor vanes close to the trailing edges of the turbine vanes means that the torque capacity of the torque converter can be increased substantially while maintaining a satisfactory torque ratio.

The spacing d1 between the turbine and the impeller results from the size of the torque converter and the flexibility of the turbine and the impeller. It is dimensioned such that there is never any contact between the vanes of the turbine and the impeller, regardless of the operational phase (the trailing edge of the impeller and the leading edge of the turbine approach one another in the converter phase during torque multiplication, 0<i<0.8). This dimensional reference is advantageously linked principally to the geometry and rigidity of the torque converter and not so much to its performance.

Parametric studies (finite element computations) have demonstrated that bringing the leading edge of the reactor close to the trailing edge of the turbine can increase the torque capacity of the torque converter. The use of this ratio d2/d1 means that advantageously, in accordance with the invention, this closing up can be characterized independently of the overall dimensions of the torque converter. Further, this ratio means that the approach of the turbine towards the reactor when the parts deform can be taken into account. During torque multiplication (in the converter phase), when the trailing edge of the impeller approaches the leading edge of the turbine, the trailing edge of the turbine also approaches the leading edge of the reactor. The lower limit for the ratio d2/d1 also provides for a minimum clearance, d2, between the trailing edge of the turbine and the leading edge of the reactor.

The torque converter of the invention preferably comprises a plurality of "elongated" reactor vanes, preferably alternate vanes. Said vanes are preferably distributed in a regular manner around the periphery of the reactor. Preferably, the set of reactor vanes, i.e. all of the reactor vanes, are "elongated".

Finally, the invention concerns an automatic transmission for automotive vehicles, characterized in that it comprises a hydraulic torque converter in accordance the invention as described above.

Other characteristics and advantages of the present invention will become apparent from the following description and from an examination of the accompanying drawings in which.

Figure 1:
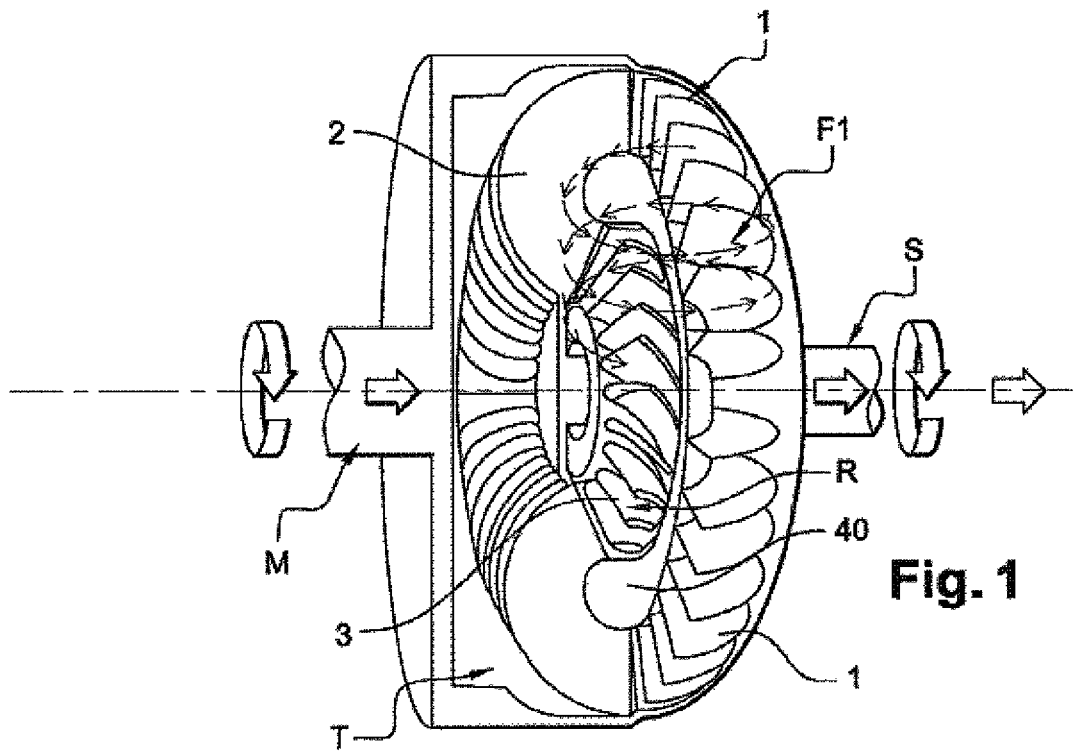
FIG. 1 shows a partial perspective view of a prior art hydraulic torque converter, certain vanes not being shown for the purposes of clarity.
Figure 2:
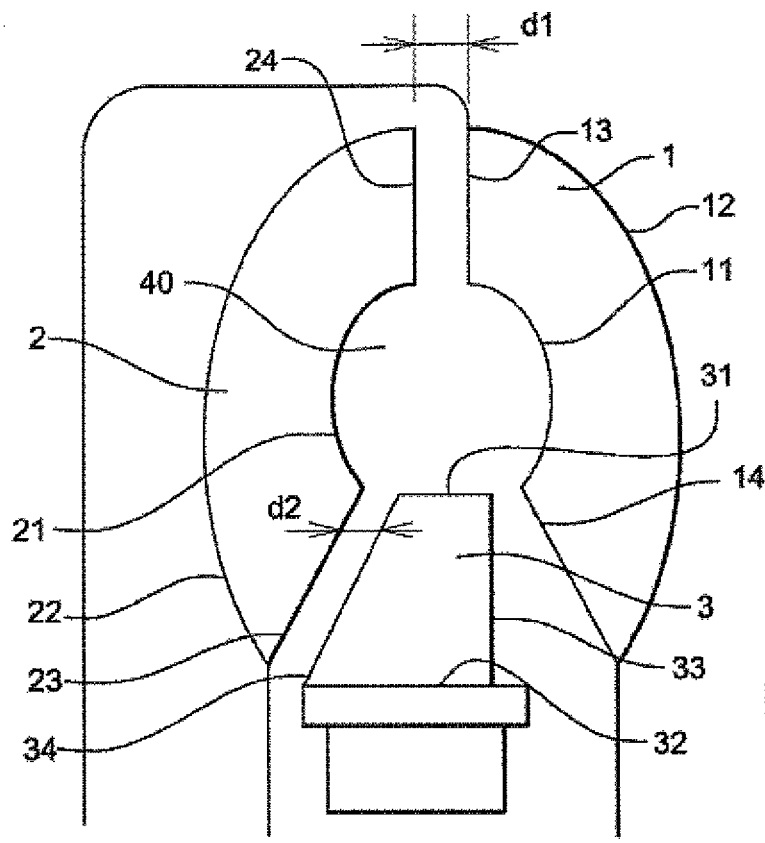
FIG. 2 is a highly diagrammatic view of a portion of a hydraulic torque converter in accordance with the invention.

We shall refer now to FIG. 2, which shows, in a highly diagrammatic manner, an impeller 1 vane, a turbine 2 vane and a reactor 3 vane of a hydraulic torque converter according to the invention.

The vanes of the impeller 1 are each defined by an inner side edge 11, an outer side edge 12, a trailing edge 13 and a leading edge 14.

The vanes of the turbine 2 are each defined by an inner side edge 21, an outer side edge 22, a trailing edge 23 and a leading edge 24.

The vanes of the reactor 3 are each defined by an inner side edge 31, an outer side edge 32, a trailing edge 33 and a leading edge 34.

The inner side edges of the impeller, turbine and reactor vanes define, during rotation thereof about the axis A, an inner core of revolution 40 about the axis A.

Figure 3:
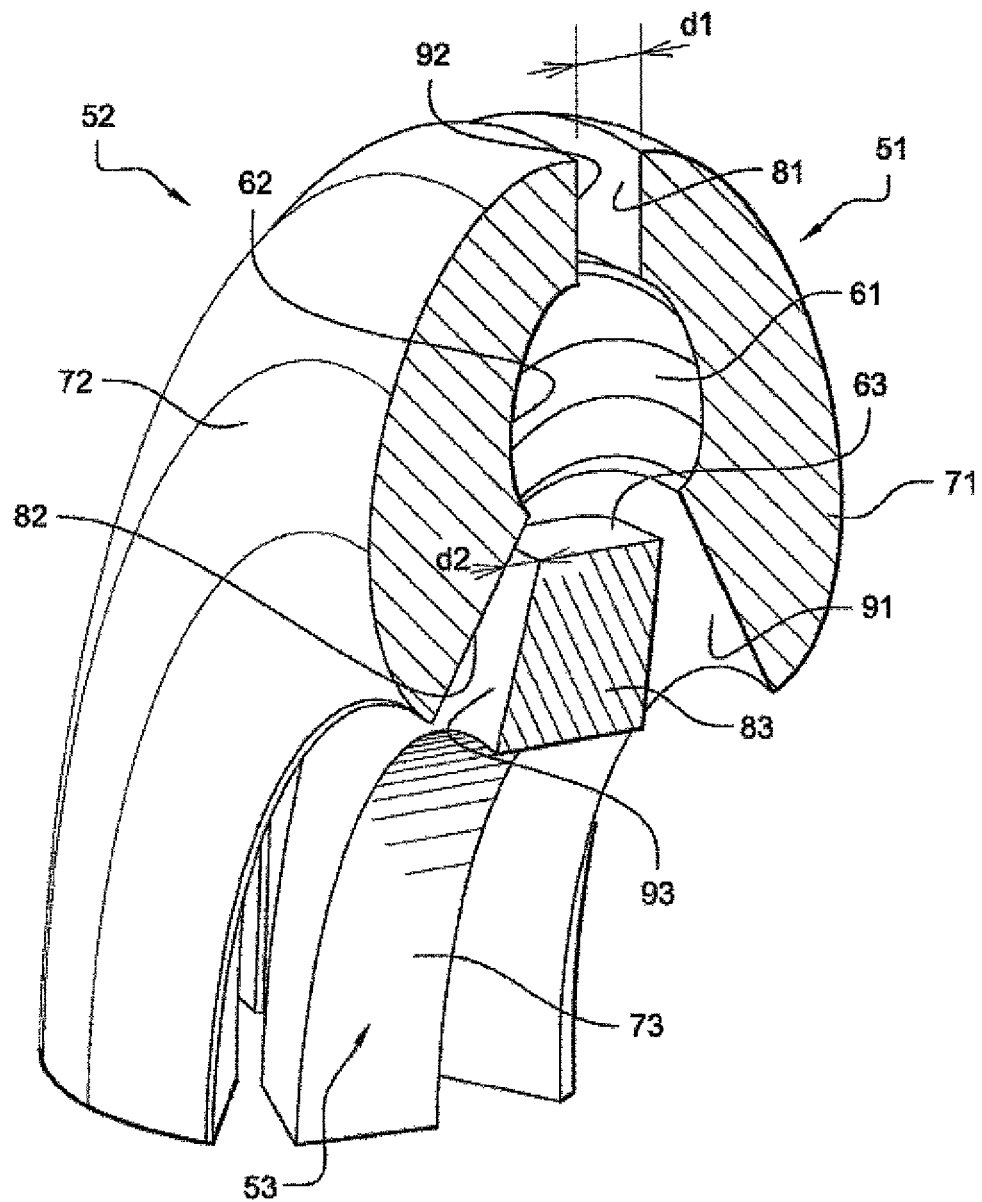
FIG. 3 is a highly diagrammatic view of the impeller, turbine and reactor envelopes defined by the vanes in a hydraulic torque converter in accordance with the invention.

Reference will now be made to FIG. 3. The impeller, reactor and turbine vanes define during rotation thereof the impeller 51, turbine 52 and reactor 53 envelopes respectively.

The term "impeller, turbine and reactor envelopes" means the surface defining the largest volume occupied by the impeller, turbine and reactor vanes respectively during rotation thereof about the axis A.

Further, the term "elongated" reactor vane means a reactor vane wherein the leading edge during rotation thereof substantially sweeps out the reactor envelope. The reactor may comprise vanes the leading edge of which is further from the trailing edges of the turbine than that of the "elongated" vanes. The edges of these vanes thus do not sweep out the envelope of the reactor during rotation thereof.

Said turbine envelope 52 comprises a turbine inner side surface 62, a turbine outer side surface 72, a turbine trailing surface 82 and a turbine leading surface 92, defined by the inner side edges, the outer side edges, the trailing edges and the leading edges respectively of the turbine vanes during rotation of the set of said vanes.

Said impeller envelope 51 comprises an impeller inner side surface 61, an impeller outer side surface 71, an impeller trailing surface 81, and an impeller leading surface 91, defined by the inner side edges, the outer side edges, the trailing edges and the leading edges respectively of the impeller vanes during rotation of the set of said vanes.

Said reactor envelope 53 comprises a reactor inner side surface 63, a reactor outer side surface 73, a reactor trailing surface 83 and a reactor leading surface 93 defined by the inner side edges, the outer side edges, the trailing edges and the leading edges respectively of the reactor vanes during rotation of the set of said vanes.

The axial distance d1 is defined as the minimum distance along the axis A of the torque converter between the impeller trailing surface 81 and the turbine leading surface 92 at the points of said facing surfaces which are closest to each other.

Similarly, the axial distance d2 is defined as the distance along the axis A of the torque converter between the turbine trailing surface 82 and the reactor leading surface 93 at the points on said facing surfaces which are closest to each other.

According to the invention, the ratio of the distances, d2/d1, is equal to or lower than 1.4, preferably equal to or lower than 1.1, and preferably equal to or greater than 0.6, more preferably equal to or greater than 0.9. Preferably, the ratio of the distances d2/d1 is approximately 1.

Figure 6:
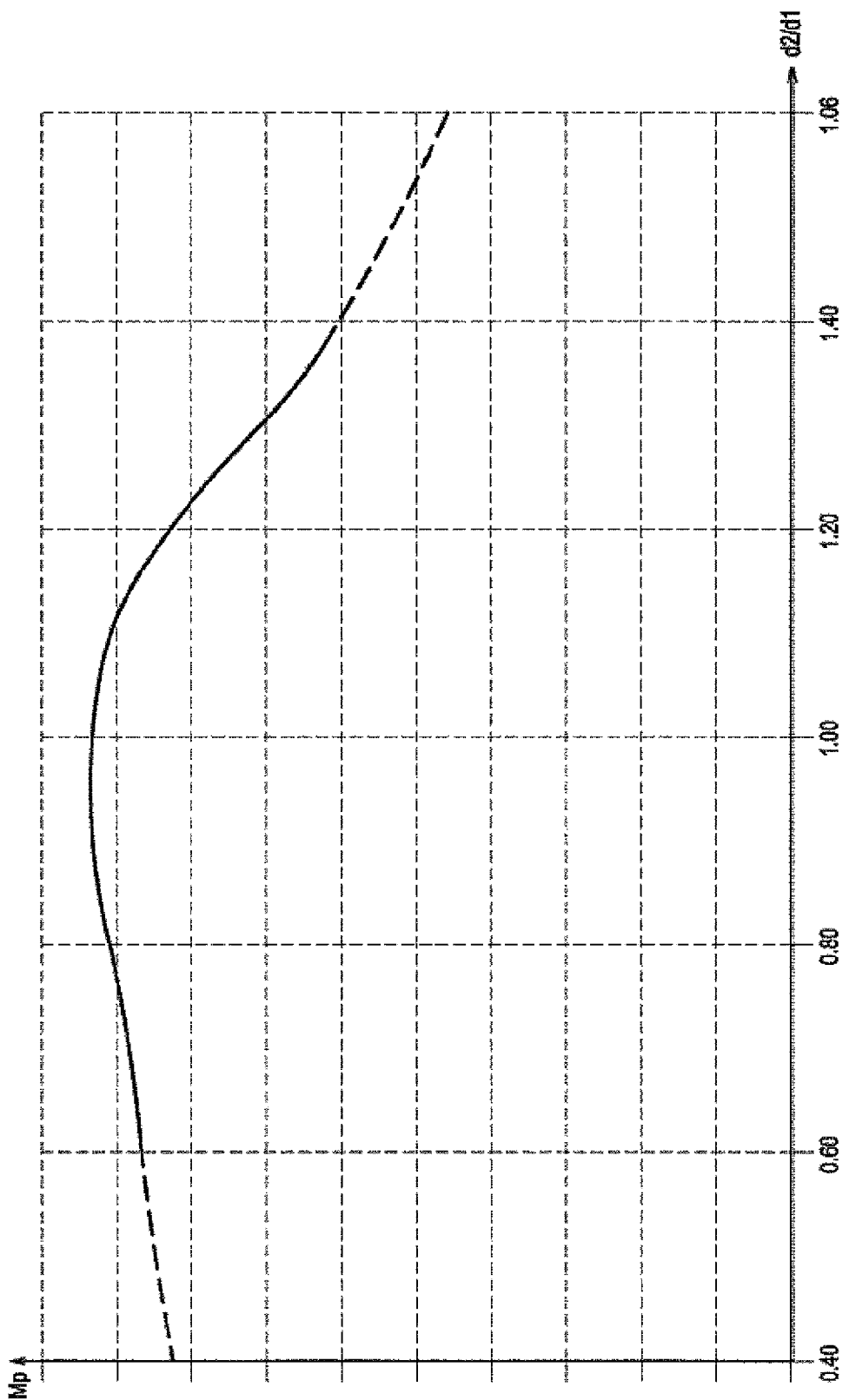
FIG. 6 shows the results of a simulation giving the stalling torque capacity (where i=0) of a hydraulic torque converter of the invention as a function of the ratio d2/d1.

Such ranges of d2/d1 in accordance with the invention advantageously define, as can be seen in FIG. 6, a zone for obtaining a maximum torque capacity. Beyond the minimum d2/d1, the fluid is sheared and the torque capacity reduces. Beyond the maximum d2/d1, the torque capacity drops.

Surprisingly, this configuration can increase the torque capacity while maintaining the torque ratio at a satisfactory level.

FIG. 6 thus shows the results of a simulation giving the stalling torque capacity Mp (when i=0) of a hydraulic torque converter of the invention as a function of the ratio d2/d1. We thus see here the ranges of d2/d1 according to the invention.

Figure 4:
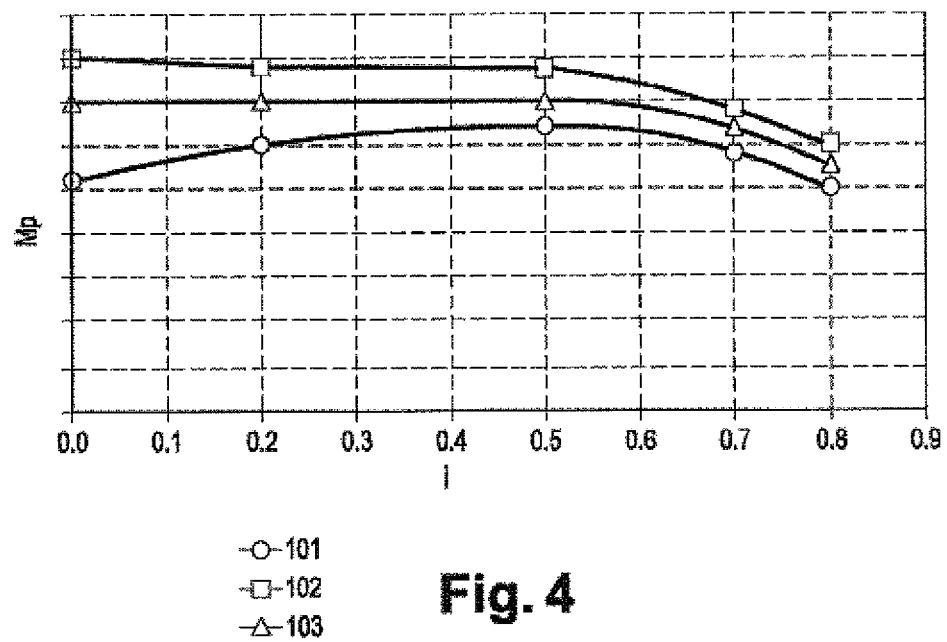
FIG. 4 shows the results of a simulation comparing the torque capacities, $M_p$, of hydraulic torque converters in accordance with the invention and of a prior art hydraulic torque converter.
Figure 5:
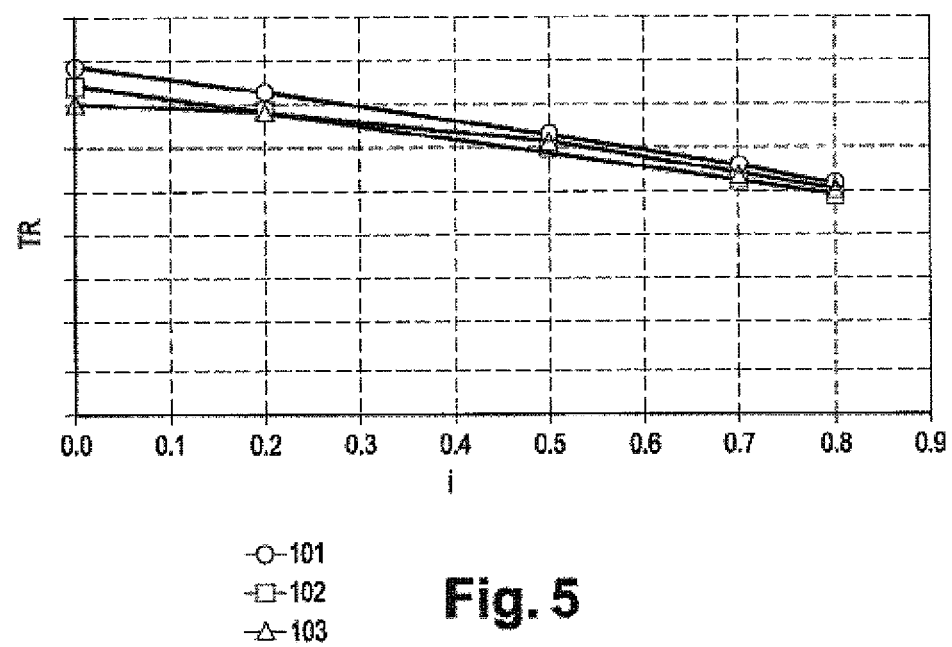
FIG. 5 shows the results of a simulation comparing the torque ratios, TR, of a hydraulic torque converter in accordance with the invention with those of a prior art hydraulic torque converter.

FIG. 4 shows the simulated torque capacities Mp for three types of hydraulic torque converter for rate ratios of 0 to 0.8. Curve 101 corresponds to a prior art hydraulic torque converter and thus does not have any "elongated" reactor vanes. Curve 102 corresponds to a hydraulic torque converter wherein all of the reactor vanes are "elongated", the ratio of the distances d2/d1 for said "elongated" vanes being 0.61, and curve 103 corresponds to a hydraulic torque converter wherein alternate reactor vanes are "elongated", the ratio of the distances d2/d1 for said "elongated" vanes being 0.61. Such a ratio of the distances d2/d1 for FIGS. 4 and 5 is within the range proposed for d2/d1. At such a constant ratio, we can see the influence of two possible configurations for the reactor vanes.

An improvement in the torque capacities of up to 40% for the hydraulic torque converter of the invention over that of the prior art is observed.

With reference now to FIG. 5, we see the simulated torque ratios TR for the same three hydraulic torque converters as for FIG. 4.

Very similar torque ratios are observed between the three types of hydraulic torque converter.

Advantageously, a torque converter of the invention thus has a high torque capacity and a torque ratio which is close to those of prior art torque converters.

Clearly, the present invention is not limited to the embodiment described and represented by way of illustrative non-limiting example. In particular, the distribution of the "elongated" reactor vanes may vary.

The invention claimed is:

1. A hydraulic torque converter for an automotive vehicle, comprising:
    an impeller (I) coaxial with an axis A and provided with impeller vanes (1), each defined by an inner side edge (11), an outer side edge (12), a trailing edge (13) and a leading edge (14);
    a turbine (T) coaxial with the axis A and provided with turbine vanes (2), each defined by an inner side edge (21), an outer side edge (22), a trailing edge (23) and a leading edge (24); and
    a reactor (R) coaxial with the axis A and provided with reactor vanes (3), each defined by an inner side edge (31), an outer side edge (32), a trailing edge (33) and a leading edge (34);
    the turbine vanes (2) defining, during rotation thereof, a turbine envelope (52), the envelope (52) comprising a turbine inner side surface (62), a turbine trailing surface (82) and a turbine leading surface (92), defined by the inner side edges (21), the trailing edges (23) and the leading edges (24) respectively of the turbine vanes (2) during the rotation;
    the impeller (1) vanes defining, during rotation thereof, an impeller envelope (51), the envelope (51) comprising an impeller inner side surface (61), an impeller trailing surface (81) and an impeller leading surface (91), defined by the inner side edges (11), the trailing edges (13) and the leading edges (14) respectively of the impeller vanes (1) during the rotation;
    the reactor vanes (3) defining, during rotation thereof, a reactor envelope (53), the envelope (53) comprising a reactor inner side surface (63), a reactor trailing surface (83) and a reactor leading surface (93), defined by the inner side edges (31), the trailing edges (33) and leading edges (34) respectively of the reactor vanes (3) during the rotation;
    the side surfaces of the turbine, impeller and reactor together defining an envelope of an inner core;
    the impeller trailing surface (81) being separated by an outer axial distance d1 from the turbine leading surface (92), the turbine trailing surface (82) being separated by an inner axial distance d2 from the reactor leading surface (93), the outer and inner axial distances respectively corresponding to the minimum axial distance between the surfaces concerned at the facing points which are closest to each other;
    the ratio of the distances d2/d1 being equal to or lower than 1.4;
    the reactor comprising at least one vane the leading edge of which defines the reactor leading surface during rotation thereof, the at least one vane being qualified as an "elongated" reactor vane.

2. The hydraulic torque converter according to claim 1, wherein the ratio of the distances d2/d1 is equal to or lower than 1.1.

3. The hydraulic torque converter according to claim 1, wherein the ratio of the distances d2/d1 is equal to or greater than 0.6.

4. The hydraulic torque converter according to claim 1, wherein the ratio of the distances d2/d1 is equal to or greater than 0.9.

5. The hydraulic torque converter according to claim 1, wherein the converter comprises a plurality of "elongated" reactor vanes.

6. The hydraulic torque converter according to claim 5, wherein the plurality of "elongated" reactor vanes are distributed in a regular manner at the periphery of the reactor.

7. The hydraulic torque converter according to claim 5, wherein each alternate reactor vane is the "elongated" vane.

8. The hydraulic torque converter according to claim 5, wherein all of the reactor vanes are "elongated".

9. An automatic transmission for an automotive vehicle, comprising a hydraulic torque converter in accordance with claim 5.

10. An automatic transmission for an automotive vehicle, comprising a hydraulic torque converter in accordance with claim 1.

* * * * *